(12) United States Patent
    Li

(10) Patent No.: US 12,548,859 B2
(45) Date of Patent: Feb. 10, 2026

(54) BATTERY CELL AND ELECTRICAL DEVICE

(71) Applicant: NINGDE AMPEREX TECHNOLOGY LIMITED, Ningde (CN)

(72) Inventor: Sheng Li, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 818 days.

(21) Appl. No.: 17/946,928

(22) Filed: Sep. 16, 2022

(65) Prior Publication Data
    US 2023/0078107 A1    Mar. 16, 2023

(30) Foreign Application Priority Data
    Sep. 16, 2021 (CN) .......................... 202111087712.8

(51) Int. Cl.
    *H01M 50/528* (2021.01)
    *H01M 10/42* (2006.01)
    (Continued)

(52) U.S. Cl.
    CPC ....... *H01M 50/528* (2021.01); *H01M 10/425* (2013.01); *H01M 10/655* (2015.04); *H01M 50/581* (2021.01); *H01M 2200/106* (2013.01)

(58) Field of Classification Search
    None
    See application file for complete search history.

(56) References Cited

U.S. PATENT DOCUMENTS

2003/0082440 A1* 5/2003 Mrotek ............... H01M 50/176
                                                          429/185
2003/0180582 A1  9/2003 Masumoto et al.
                    (Continued)

FOREIGN PATENT DOCUMENTS

CN          1465109 A    12/2003
CN        101926021 A    12/2010
                 (Continued)

OTHER PUBLICATIONS

Office Action, CN202111087712.8, Dec. 19, 2023, 8 pgs.
(Continued)

*Primary Examiner* — Amanda J Barrow
(74) *Attorney, Agent, or Firm* — XSENSUS LLP

(57) ABSTRACT

A battery cell includes a housing, an electrode assembly, a positive electrode column and a negative electrode column. The housing includes an accommodation cavity accommodating the electrode assembly. The positive electrode column and the negative electrode column are electrically connected to the electrode assembly, the positive electrode column and the negative electrode column respectively protrude from an outer end surface of the housing, the outer end surface is concave toward the accommodation cavity to form a concave part, and the concave part is disposed between the positive electrode column and the negative electrode column. A protecting member disposed at the concave part, the protecting member is electrically connected to the positive electrode column, and the protecting member is used for electrical connection with an external device or an external circuit. The concave part in the housing is formed concavely toward the accommodation cavity of the housing.

16 Claims, 6 Drawing Sheets

(51) Int. Cl.
*H01M 10/655* (2014.01)
*H01M 50/581* (2021.01)

(56) References Cited

U.S. PATENT DOCUMENTS

| | | | |
|---|---|---|---|
| 2004/0170887 A1* | 9/2004 | Masumoto | H01M 50/593 |
| | | | 429/185 |
| 2011/0064972 A1* | 3/2011 | Park | H01M 10/425 |
| | | | 429/7 |
| 2014/0363703 A1 | 12/2014 | Park et al. | |
| 2015/0024262 A1 | 1/2015 | Hwang | |
| 2015/0064519 A1* | 3/2015 | Hong | H01M 50/55 |
| | | | 429/62 |

FOREIGN PATENT DOCUMENTS

| | | |
|---|---|---|
| CN | 209766544 U | 12/2019 |
| JP | 2000-311667 A | 11/2000 |
| JP | 2011-505665 A | 2/2011 |
| JP | 2020013969 A | 1/2020 |
| JP | 2015-011848 A | 1/2021 |
| WO | WO2016197567 A1 | 12/2016 |
| WO | WO2018080242 A1 | 5/2018 |
| WO | WO2018090179 A1 | 5/2018 |
| WO | WO2019/187939 A1 | 1/2021 |
| WO | WO2021/176919 A1 | 9/2021 |

OTHER PUBLICATIONS

Ningde Amperex Technology Ltd., Extended European Search Report, EP22196097.4, Feb. 9, 2023, 7 pgs.
Office Action, JP2022-146535, Nov. 7, 2023, 4 pgs.

\* cited by examiner

BATTERY CELL AND ELECTRICAL DEVICE

CROSS REFERENCE TO THE RELATED APPLICATIONS

This application claims priority to Chinese Patent Application No. 202111087712.8 filed on Sep. 16, 2021, the entire content of which is incorporated herein by reference.

TECHNICAL FIELD

This application relate to the technical field of energy storage.

BACKGROUND

Battery cells are apparatuses that convert external energy into electrical energy and store the electrical energy therein, so as to supply power to external electrical devices (such as portable electronic devices) when in need. The battery cells are widely used in daily life, providing great convenience and richness for people's daily life. Generally, a battery cell includes a housing and an electrode assembly, and the electrode assembly is accommodated in the housing. However, in recent years, with the use of high-power hardware, a capacity of the battery cell also increases, and discharge and charge currents of the battery cell also increase. In order to ensure safety performance of a battery, a fuse is usually configured on the battery. When the discharge current or charge current of the battery cell is overloaded, the fuse may be blown to avoid the risk of spontaneous combustion caused by an excessive high temperature of the battery cell due to the overloaded discharge current or charge current.

In the process of implementing the present application, an applicant of the present application found that: at present, in order to install the fuse on the housing, usually a concave part is directly dug in the housing, and then the fuse is installed in the concave part, and in order to dig the concave part in the housing, a thickness of the housing needs to be increased, which not only increases weight of the housing, but also loses energy density (ED) of the battery cell.

SUMMARY

In view of the above problem, some embodiments of the present application provide a battery cell and an electrical device, which overcome or at least partially solve the above problem that a thickness of a housing needs to be increased since a concave part is dug in the housing to place a fuse.

According to one aspect of some embodiments of the present application, a battery cell is provided, and includes a housing, an electrode assembly, a positive electrode column, a negative electrode column and a protecting member, the housing includes an accommodation cavity, the electrode assembly is accommodated in the accommodation cavity, one end of the positive electrode column and one end of the negative electrode column are electrically connected to the electrode assembly respectively, the other ends of the positive electrode column and the negative electrode column respectively protrude from an outer end surface of the housing, the outer end surface is concave toward the accommodation cavity to form a concave part, and the concave part is disposed between the positive electrode column and the negative electrode column; and the battery cell further includes the protecting member, the protecting member is disposed at the concave part, one end of the protecting member is electrically connected to the positive electrode column, and another of the protecting member is used for electrical connection with an external device or an external circuit. The concave part in the housing of the present application is formed concavely toward the accommodation cavity of the housing. Compared with the case in which the concave part is dug in the housing to place the protecting member in the prior art, in the present application, neither a thickness of the housing nor a weight of the battery cell is additionally increased due to the arrangement of the concave part. The concave part in the housing of the present application is formed concavely toward the accommodation cavity of the housing, and the concave part may be used to place the protecting member, that is, the protecting member in the battery cell of the present application utilizes the space of the accommodation cavity inside the housing, thereby improving overall space utilization rate of the battery cell and improving energy density of the battery cell.

In an optional manner, the battery cell further includes a heat-conducting member, the heat-conducting member is disposed at a bottom of the concave part, and the heat-conducting member is disposed between the protecting member and the bottom of the concave part.

In an optional manner, the concave part is provided with a liquid injection port, and the liquid injection port is configured for liquid injection into the accommodation cavity.

In an optional manner, the battery cell further includes a first connecting member and a second connecting member, two ends of the first connecting member are electrically connected to the protecting member and the positive electrode column respectively, a first end of the second connecting member is connected to the protecting member, and a second end of the second connecting member is used for electrical connection with the external device or the external circuit.

In an optional manner, the battery cell further includes a first insulating member, the first insulating member is disposed between the first connecting member and the outer end surface of the housing, and the first insulating member is configured for insulating the first connecting member from the housing.

In an optional manner, the battery cell further includes a second insulating member, the second insulating member is disposed between the second connecting member and the outer end surface at the concave part, and the second insulating member is configured for insulating the second connecting member from the housing.

In an optional manner, the battery cell further includes a fixing member, the fixing member fills a space between the outer end surface and the protecting member in the concave part, the fixing member is used to fix the protecting member in the concave part, and the first connecting member and the second connecting member respectively extend from the fixing member. The fixing member limits the movement of the protecting member, so as to protect the protecting member from damage caused by collisions. The fixing member limits movement of the end of the first connecting member connected to the protecting member, so as to protect said end from damage caused by collisions. The fixing member limits movement of the first end of the second connecting member connected to the protecting member, so as to protect said end from damage caused by collisions.

In an optional manner, the fixing member further completely covers an outer surface of the protecting member, deviated from the bottom of the concave part. Therefore, the fixing member can not only fix the protecting member to the housing, but also improve waterproof and anti-corrosion performance of the protecting member, thereby improving overall drop performance of the battery cell.

In an optional manner, the fixing member is formed of fluid resin cured after being poured into the concave part.

In an optional manner, the second connecting member is bent and extends out of the housing, and the second end of the second connecting member is located between the positive electrode column and the negative electrode column.

In an optional manner, the second connecting member is bent and extends out of the housing and toward the positive electrode column, and the second end of the second connecting member is bent and extends to be above the positive electrode column.

In an optional manner, the battery cell further includes a third insulating member, the third insulating member is located above the positive electrode column, and the third insulating member is located between the second connecting member and the first connecting member.

In some embodiments, the third insulating member is also located above the second connecting member and the positive electrode column.

In some embodiments, the third insulating member is bonded to the second connecting member, and/or the third insulating member is bonded to the first connecting member, and/or the third insulating member is bonded above the positive electrode column.

In an optional manner, the protecting member includes a temperature cut-off (TCO), a positive temperature coefficient materials (PTC) or a printed circuit board (PCB).

The TCO is used to cut off the electrical connection between the protecting member and the positive electrode column when the temperature of the battery cell exceeds a preset value, and then cut off the electrical connection between the external device or the external circuit and the electrode assembly, thereby reducing the risk of fire and explosion of the electrode assembly, and reducing the damage to the external device or the external circuit.

The PTC is used to rapidly reduce a current in a loop when the temperature of the battery cell exceeds a switching temperature, thereby playing a protective role for the electrode assembly and the external device or the external circuit connected to the electrode assembly.

The PCB, referred to as a circuit board, is used for the electrical connection between the electrode assembly and the external circuit or the external device. The PCB may also be used to manage the charge and discharge of the electrode assembly, thereby reducing the damage to the external device or the external circuit caused by a battery assembly due to the reasons such as overvoltage, overcurrent, and temperature rise.

In an optional manner, while the outer end face of the housing is concave toward the accommodation cavity to form the concave part, a convex part is also formed. The concave part faces the outside of the housing, and the convex part faces the accommodation cavity in the housing. The battery cell further includes an insulating gasket, the insulating gasket is accommodated in the accommodation cavity, the insulating gasket is located between the convex part of the housing and the electrode assembly, and the insulating gasket is used to insulate the housing from the electrode assembly. The positive electrode column of the battery cell is connected to the electrode assembly, then penetrates the insulating gasket, and then penetrates the outer end surface of the housing. The insulating gasket is further provided with a through hole, the through hole is opposite to the liquid injection port, and the through hole and the liquid injection port are configured for liquid injection into the accommodation cavity of the housing.

According to one aspect of some embodiments of the present application, an electrical device is provided, and includes the above battery cell.

Beneficial effects of some embodiments of the present application include: the battery cell is provided, and includes the housing, the electrode assembly, the positive electrode column, the negative electrode column and the protecting member, the housing is provided with the accommodation cavity, and the electrode assembly is accommodated in the accommodation cavity. One end of the positive electrode column and one end of the negative electrode column are electrically connected to the electrode assembly respectively. The other ends of the positive electrode column and the negative electrode column respectively protrude from an outer end surface of the housing. The outer end surface of the housing is concave toward the accommodation cavity to form a concave part, and the concave part is disposed between the positive electrode column and the negative electrode column. The protecting member is disposed at the concave part, one end of the protecting member is electrically connected to the positive electrode column, and another of the protecting member is used for electrical connection with an external device or an external circuit. The concave part in the housing of the present application is formed concavely toward the accommodation cavity of the housing. Compared with the case in which the concave part is dug in the housing to place the protecting member in the prior art, in the present application, neither a thickness of the housing nor a weight of the battery cell is additionally increased due to the arrangement of the concave part. In addition, the concave part in the housing of the present application is formed concavely toward the accommodation cavity of the housing, and the concave part can be used to place the protecting member. Therefore, the protecting member in the battery cell utilizes the space of the accommodation cavity in the housing, which can improve overall space utilization rate of the battery cell and improve energy density of the battery cell.

BRIEF DESCRIPTION OF DRAWINGS

One or more embodiments are illustratively explained by the figures in the corresponding accompanying drawings, and these exemplary explanations do not constitute limitations to the embodiments. Elements with the same reference numerals in the drawings are denoted as similar elements. Unless otherwise stated, the figures in the accompanying drawings do not constitute a scale limitation.

DETAILED DESCRIPTION

In order to facilitate the understanding of the present application, the present application will be described in more detail below in combination with the accompanying drawings and specific embodiments. It should be noted that when an element is referred to as "being fixed to" the other element, the element may be directly on the other element, or there may be one or more intermediate elements therebetween. When an element is referred to as "being connected to" the other element, the element may be directly connected to the other element, or there may be one or more intermediate elements therebetween. The terms "vertical", "horizontal", "left", "right", "inner", "outer" and similar expressions used in the description are for illustrative purposes only.

Unless otherwise defined, all technical and scientific terms used in the description have the same meaning as generally understood by those skilled in the art to which the present application pertains. The terms used in the description of the present application are merely for the purpose of describing the particular embodiments, and are not intended to limit the present application. The term "and/or" as used in the description includes any and all combinations of one or more of the associated listed items.

Figure 1:
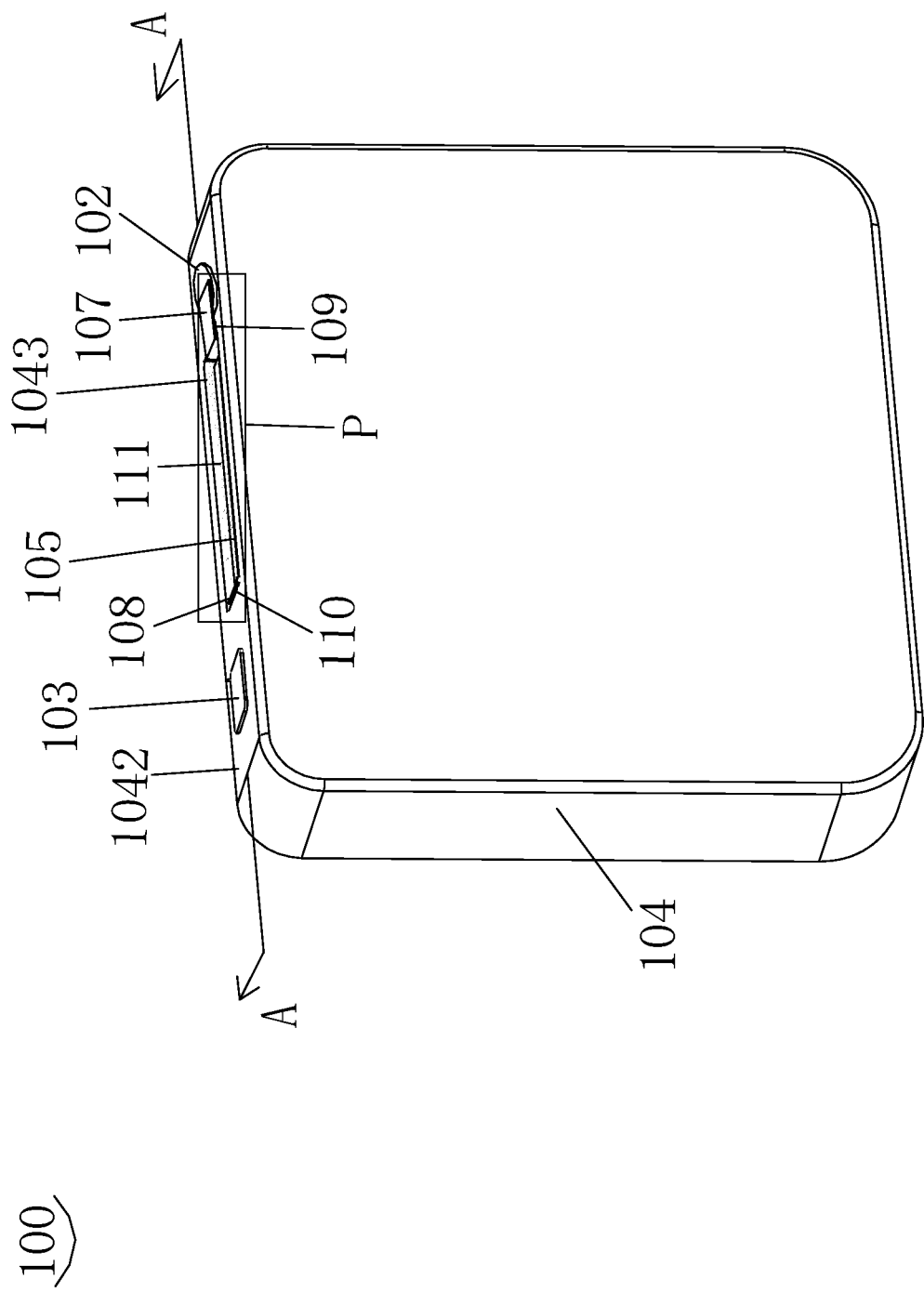
FIG. 1 is a schematic diagram of an implementation of a battery cell according to an embodiment of the present application.
Figure 2:
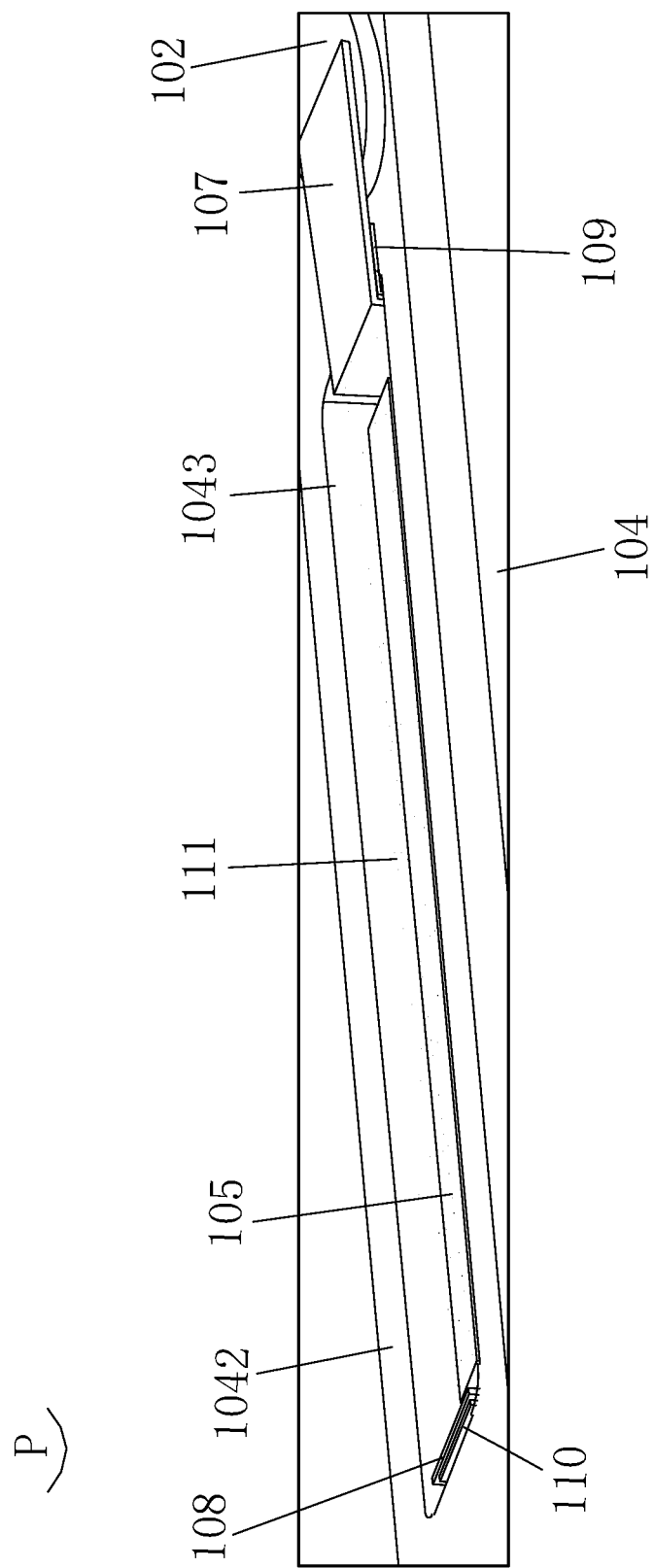
FIG. 2 is an enlarged view of a part P in FIG. 1 according to an embodiment of the present application.
Figure 3:
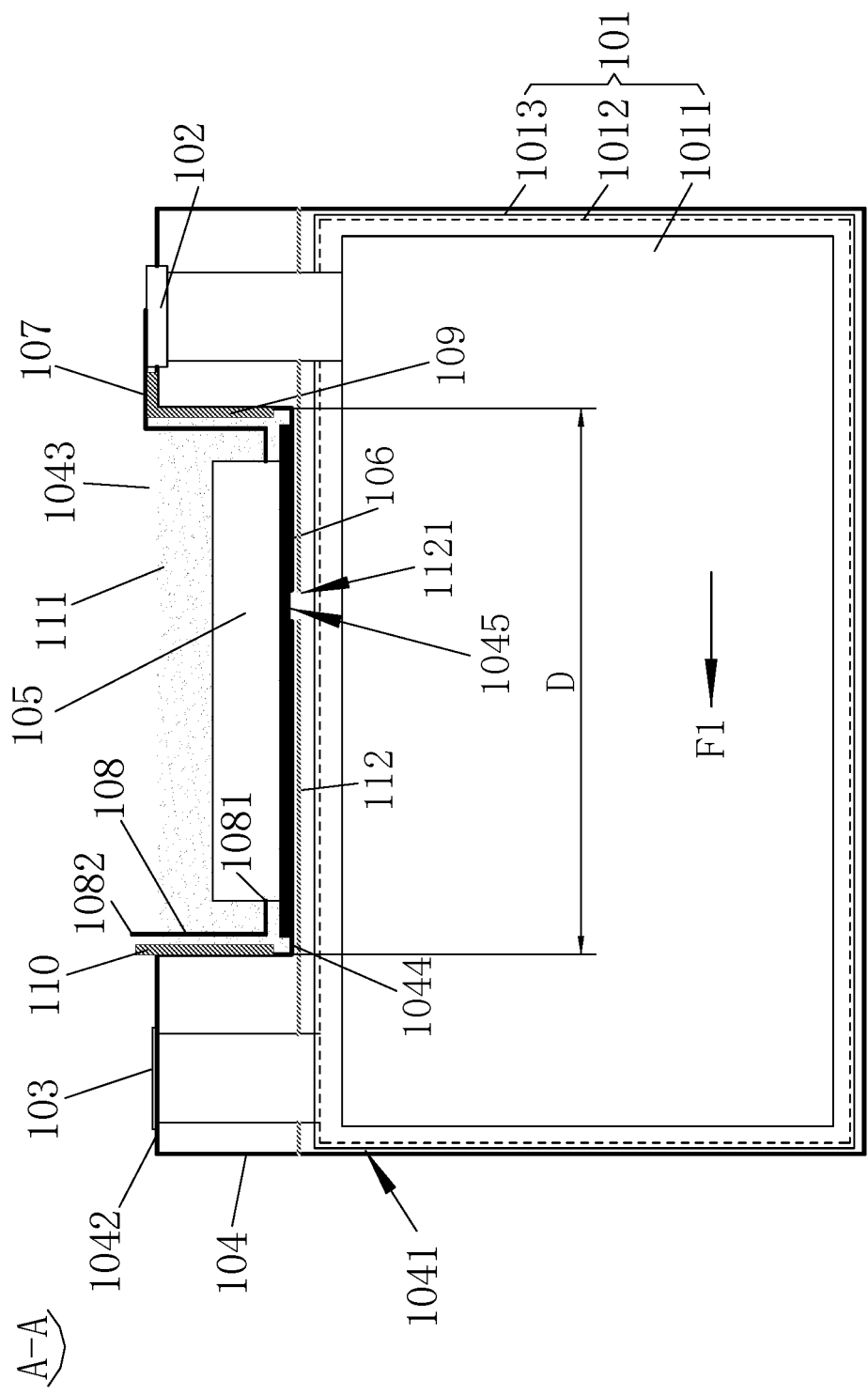
FIG. 3 is a cross-sectional view along a line A-A in FIG. 1 according to an embodiment of the present application.

Referring to FIG. 1, FIG. 2 and FIG. 3, a battery cell 100 includes an electrode assembly 101, a positive electrode column 102, a negative electrode column 103, a housing 104, a protecting member 105, a heat-conducting member 106, a first connecting member 107, a second connecting member 108, a first insulating member 109, a second insulating member 110, a fixing member 111 and an insulating gasket 112. The electrode assembly 101 is accommodated in the housing 104. One end of the positive electrode column 102 is connected to the electrode assembly 101, and the other end of the positive electrode column 102 penetrates out of the housing 104. The other end of the positive electrode column 102 protrudes from the housing 104. The electrode assembly 101 is electrically connected to the housing 104, the negative electrode column 103 protrudes from the housing 104, and the negative electrode column 103 is electrically connected to the housing 104. The protecting member 105 is located in the housing 104. The heat-conducting member 106 is located between the protecting member 105 and the housing 104. Two ends of the first connecting member 107 are electrically connected to the protecting member 105 and the positive electrode column 102 respectively. The second connecting member 108 is electrically connected to the protecting member 105, and the second connecting member 108 is used for electrical connection with an external device or an external circuit. The first insulating member 109 is configured for insulating the first connecting member 107 from the housing 104. The second insulating member 110 is configured for insulating the second connecting member 108 from the housing 104. The fixing member 111 is used to fix the protecting member 105 and the housing 104. The insulating gasket 112 is used to insulate the housing 104 from the electrode assembly 101.

It should be noted that the object of the present application can still be achieved in the case that the battery cell 100 may not include the above heat-conducting member 106, first connecting member 107, second connecting member 108, first insulating member 109, second insulating member 110, fixing member 111 and insulating gasket 112.

For the above electrode assembly 101, please refer to FIG. 3, the electrode assembly 101 is used to supply power to the external device or the electrode assembly 101 may also be charged by an external power source, an external power grid, or the like. The electrode assembly 101 includes a first electrode plate 1011, a separator 1013 and a second electrode plate 1012 which are stacked in sequence. Polarities of the first electrode plate 1011 and the second electrode plate 1012 are opposite. For example, if the first electrode plate 1011 is a positive electrode plate, the second electrode plate 1012 is a negative electrode plate, or if the first electrode plate 1011 is a negative electrode plate, the second electrode plate 1012 is a positive electrode plate. The first electrode plate 1011, the separator 1013 and the second electrode plate 1012 may be of a winding structure formed by stacking and then winding, and may also be of a stacked structure formed by only stacking without winding. No matter whether the electrode assembly 101 is of a winding structure or a stacked structure, the formed technical solution may achieve the application object of the present application.

For the above positive electrode column 102 and negative electrode column 103, please refer to FIG. 1 and FIG. 3, one end of the positive electrode column 102 is electrically connected to the first electrode plate 1011 of the electrode assembly 101, and the other end of the positive electrode column 102 penetrates out of the housing 104 to be electrically connected to the external device, the external circuit, the external power source, the external power grid, or the like.

In some embodiments, one end of the negative electrode column 103 is electrically connected to the second electrode plate 1012 of the electrode assembly 101, and the other end of the negative electrode column 103 penetrates out of the housing 104 to be electrically connected to the external device, the external circuit, the external power source, the external power grid, or the like.

In some other embodiments, the second electrode plate 1012 in the electrode assembly 101 is connected to the housing 104 through an electrode terminal, or a conductive sheet, etc., the above negative electrode column 103 is disposed on the housing 104 in a protruding manner, and the negative electrode column 103 is electrically connected to the external device, the external circuit, the external power source, the external power grid, or the like.

For the above housing 104, please refer to FIG. 3, the housing 104 is provided with an accommodation cavity 1041, and the electrode assembly 101 is accommodated in the accommodation cavity 1041. The housing 104 has an outer end surface 1042, the outer end surface 1042 is used to allow the positive electrode column 102 electrically connected to the electrode assembly 101 to penetrate out of, and the outer end surface 1042 is also where the negative electrode column 103 is disposed. The housing 104 is electrically connected to the negative electrode column 103, and the housing 104 is insulated from the positive electrode column 102.

In some embodiments, the housing 104 is a cube, the housing 104 has six outer surfaces, and the outer end surface 1042 mentioned in the present application is one of the six outer surfaces of the housing 104.

In some embodiments, the housing 104 is a cylinder, the housing 104 has three outer surfaces, and the outer end surface 1042 mentioned in the present application is one of the three outer surfaces of the housing 104.

The outer end surface 1042 of the housing 104 is concave toward the accommodation cavity 1041 to form a concave part 1043 and a convex part 1044, and the concave part 1043 and the convex part 1044 are simultaneously formed when the outer end surface 1042 of the housing 104 is concave toward the accommodation cavity 1041. The concave part 1043 faces the outside of the housing 104. The convex part 1044 faces the accommodation cavity 1041 in the housing 104. The concave part 1043 is located between the positive electrode column 102 and the negative electrode column 103. The concave part 1043 is where the protecting member 105 is located. The concave part 1043 in the housing 104 of the present application is formed concavely toward the accommodation cavity 1041 of the housing 104. Compared with the case in which the concave part 1043 is dug in the housing 104 to place the protecting member 105 in the prior art, in the present application, neither a thickness of the housing 104 nor a weight of the battery cell 100 is additionally increased due to the arrangement of the concave part 1043. The concave part 1043 in the housing 104 of the present application is formed concavely toward the accommodation cavity 1041 of the housing 104, that is, the space of the accommodation cavity 1041 in the housing 104 of the battery cell 100 is reasonably utilized, thereby improving overall space utilization rate of the battery cell 100 and improving energy density of the battery cell 100.

In some embodiments, the concave part 1043 is located between the positive electrode column 102 and the negative electrode column 103, and the concave part 1043 is disposed close to the positive electrode column 102, so as to facilitate the electrical connection between the protecting member 105 disposed in the concave part 1043 and the positive electrode column 102.

In some embodiments, please refer to FIG. 3, the concave part 1043 is further provided with a liquid injection port 1045, and the liquid injection port 1045 communicates with the accommodation cavity 1041. The liquid injection port 1045 is configured for liquid injection into the accommodation cavity 1041. The liquid injection port 1045 may also be used to replace the electrolyte in the accommodation cavity 1041 of the housing 104. The liquid injection port 1045 is disposed in the concave part 1043 instead of other parts on the outer end surface 1042 of the housing 104 other than the concave part 1043, so that the outer end surface 1042 is not occupied due to the arrangement of the liquid injection port 1045. Therefore, a size of the concave part 1043 can be set to be larger, and the concave part 1043 can be disposed in the outer end surface 1042 other than the regions where the positive electrode column 102 penetrates and the negative electrode column 103 is disposed.

In some embodiments, please refer to FIG. 3, in a direction F1 from the positive electrode column 102 to the negative electrode column 103, a size D of the concave part 1043 is between 2 mm and 102 mm. As the size D of the concave part 1043 is greater than 2 mm, processing and forming of the concave part 1043 are facilitated. In the commonly used battery cell 100, in the direction F1 from the positive electrode column 102 to the negative electrode column 103, a width of the battery cell 100 is not more than 110 mm, the minimum width of the positive electrode column 102 is 4 mm, the minimum width of the negative electrode column 103 is 4 mm, and then a value of the size D of the concave part 1043 may be 102 mm.

In some embodiments, the direction F1 from the positive electrode column 102 to the negative electrode column 103 is also referred to as a width direction of the battery cell 100.

For the above housing 104, the housing 104 is hard, and resistant to pressure and deformation, so as to play a protective role for the electrode assembly 101 accommodated in the accommodation cavity 1041.

In some embodiments, the housing 104 is made of a metal material, such as a steel alloy, an aluminum alloy, an iron alloy and a copper alloy. The metal material can be adaptively adjusted according to actual needs.

For the above protecting member 105, please refer to FIG. 1, FIG. 2 and FIG. 3, the protecting member 105 is disposed at the concave part 1043, one end of the protecting member 105 is electrically connected to the positive electrode column 102, and another of the protecting member 105 is used for electrical connection with the external device or the external circuit.

The protecting member 105 plays a protective role for the battery cell 100, and can reduce the damage to the external device or the external circuit caused by a battery assembly due to the reasons such as overvoltage, overcurrent and temperature rise, thereby playing a protective role.

The protecting member 105 includes a temperature cut-off (TCO), a positive temperature coefficient materials (PTC) or a printed circuit board (PCB).

The TCO is used to cut off the electrical connection between the protecting member 105 and the positive electrode column 102 when the temperature of the battery cell 100 exceeds a preset value, and then cut off the electrical connection between the external device or the external circuit and the electrode assembly 101, thereby reducing the risk of fire and explosion of the electrode assembly 101, and reducing the damage to the external device or the external circuit.

The PTC is used to rapidly reduce a current in a loop when the temperature of the battery cell 100 exceeds a switching temperature, thereby playing a protective role for the electrode assembly 101 and the external device or the external circuit connected to the electrode assembly 101.

The PCB, referred to as a circuit board, is used for the electrical connection between the electrode assembly 101 and the external circuit or the external device. The PCB may also be used to manage the charge and discharge of the electrode assembly 101, thereby reducing the damage to the external device or the external circuit caused by a battery assembly due to the reasons such as overvoltage, overcurrent, and temperature rise.

In some embodiments, the outer surface, deviated from the bottom of the concave part 1043, of a protecting plate is flush with the outer end surface 1042 of the housing 104, or the outer surface, deviated from the bottom of the concave part 1043, of the protecting plate is flush with one side, deviated from the electrode assembly 101, of the positive electrode column 102 or the negative electrode column 103, so that the shape of the battery cell 100 is regular.

For the above heat-conducting member 106, please refer to FIG. 3, the heat-conducting member 106 is disposed at the bottom of the concave part 1043, and the heat-conducting member 106 is disposed between the protecting member 105 and the bottom of the concave part 1043. When the electrode assembly 101 generates heat, the heat-conducting member 106 is used to conduct the heat to the protecting member 105. Therefore, the heat-conducting member 106 is disposed to reduce a heat difference between the protecting member 105 and the electrode assembly 101, which further improves protection performance of the protecting member 105 for the electrode assembly 101 and the like.

In some embodiments, the heat-conducting member 106 is heat-conducting silicone grease or heat-conducting adhesive tape.

In some embodiments, the heat-conducting member 106 is bonded to the bottom of the concave part 1043, and the heat-conducting member 106 is further bonded to the protecting member 105, so that the protecting member 105 can be fixed to the housing 104 to reduce the damage to the protecting member 105 caused by shaking.

For the above first connecting member 107 and second connecting member 108, please refer to FIG. 1, FIG. 2 and FIG. 3, two ends of the first connecting member 107 are electrically connected to the protecting member 105 and the positive electrode column 102 respectively. A first end 1081 of the second connecting member 108 is electrically connected to the protecting member 105, and a second end 1082 of the second connecting member 108 is used for electrical connection with the external device or the external circuit.

It can be understood that both the first connecting member 107 and the second connecting member 108 are electrically conductive, or at least a part of the first connecting member 107 is electrically conductive, and a part of the second connecting member 108 is electrically conductive.

Optionally, please refer to FIG. 1, FIG. 2 and FIG. 3, the second connecting member 108 is bent and extends out of the housing 104, and the second end 1082 of the second connecting member 108 is located between the positive electrode column 102 and the negative electrode column 103.

Figure 4:
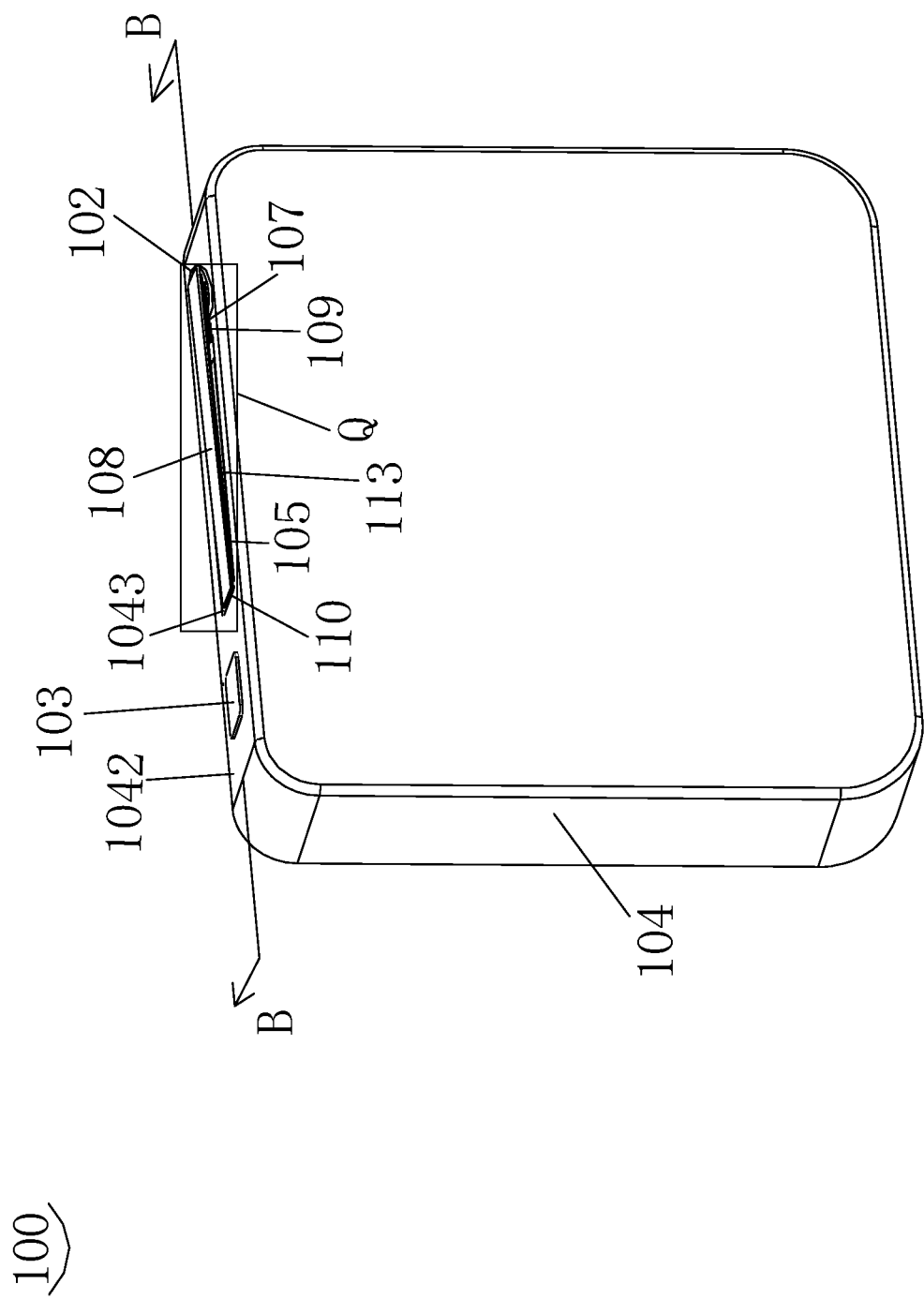
FIG. 4 is a schematic diagram of another implementation of a battery cell according to an embodiment of the present application.
Figure 5:
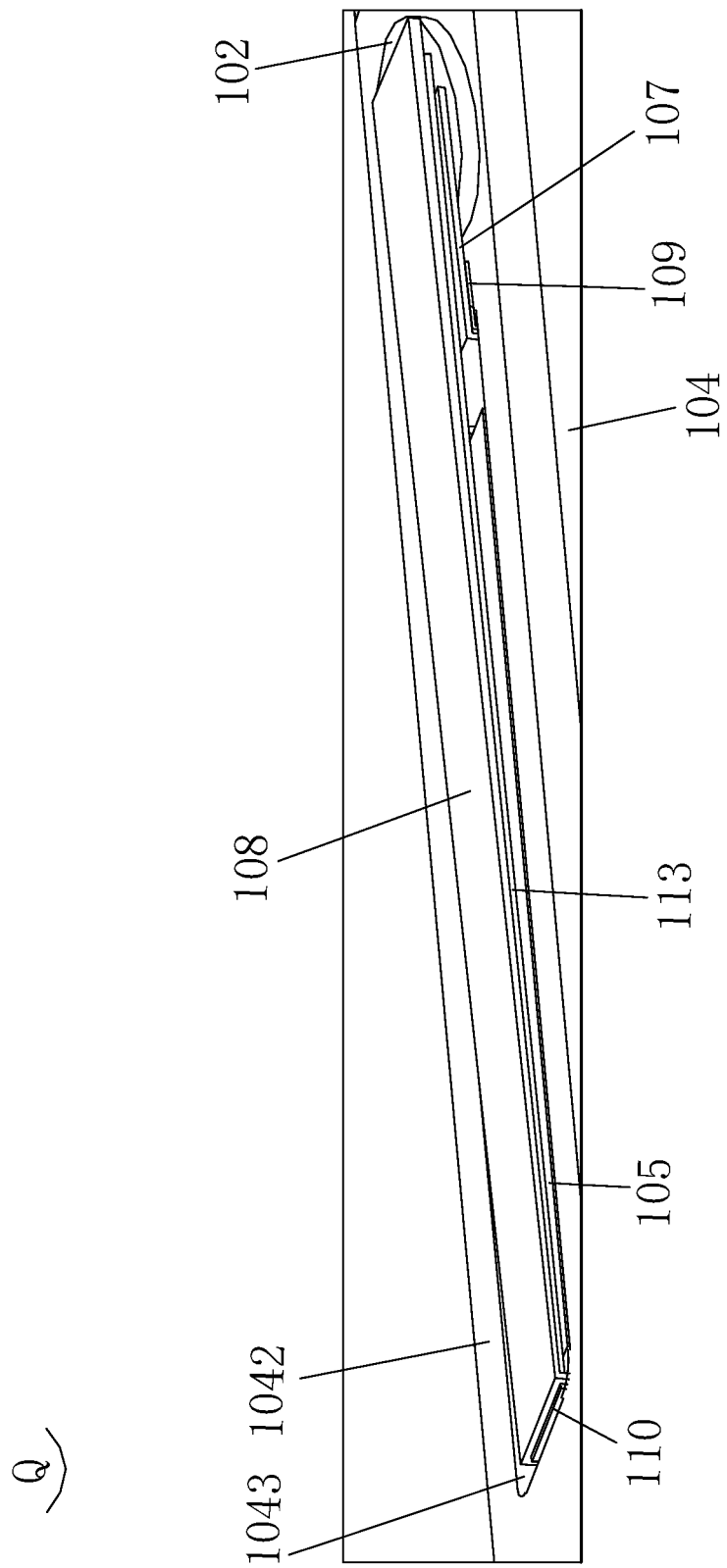
FIG. 5 is an enlarged view of a part Q in FIG. 4 according to an embodiment of the present application.
Figure 6:
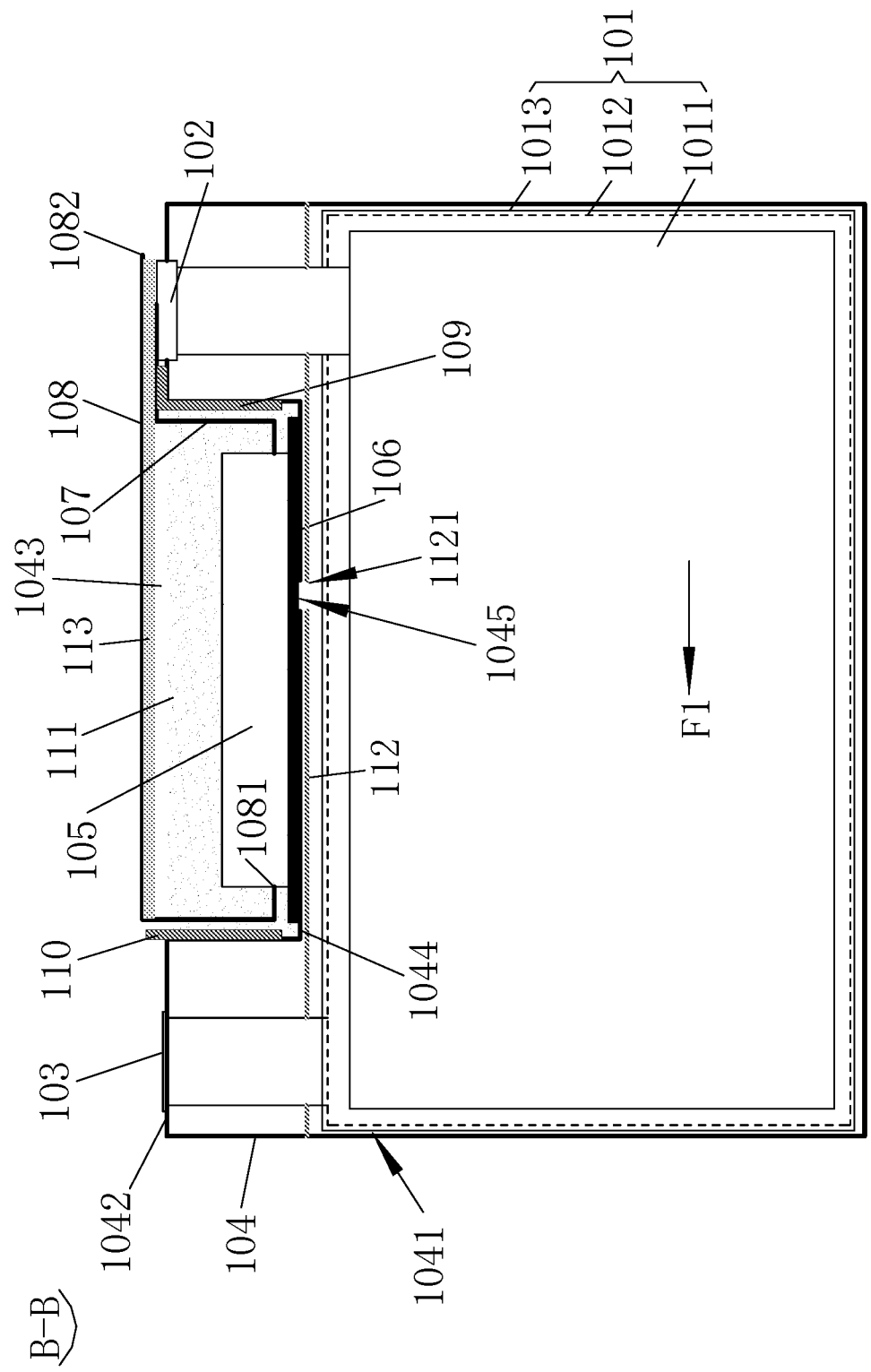
FIG. 6 is a cross-sectional view along a line B-B in FIG. 4 according to an embodiment of the present application.

Optionally, please refer to FIG. 4, FIG. 5 and FIG. 6, the second connecting member 108 is bent and extends out of the housing 104 and toward the positive electrode column 102, and the second end 1082 of the second connecting member 108 is bent and extends to be above the positive electrode column 102.

"Above the positive electrode column 102" refers to a side, away from the electrode assembly 101, of the positive electrode column 102.

For the above first insulating member 109, please refer to FIG. 3 or FIG. 6, the first insulating member 109 is disposed between the first connecting member 107 and the outer end surface 1042 of the housing 104, and the first insulating member 109 is configured for insulating the first connecting member 107 from the housing 104.

In some embodiments, the first insulating member 109 is bonded to the first connecting member 107, and/or the first insulating member 109 is bonded to the outer end surface 1042 of the housing 104.

For the above second insulating member 110, please refer to FIG. 3 or FIG. 6, the second insulating member 110 is located between the second connecting member 108 and the outer end surface 1042 at the concave part 1043, and the second insulating member 110 is configured for insulating the second connecting member 108 from the housing 104.

In some embodiments, the second insulating member 110 is bonded to the second connecting member 108, and/or the second insulating member 110 is bonded to the outer end surface 1042 at the concave part 1043.

When the second connecting member 108 is bent and extends out of the housing 104 and toward the positive electrode column 102, and the second end 1082 of the second connecting member 108 is bent and extends to be above the positive electrode column 102, please refer to FIG. 6, the battery cell 100 further includes a third insulating member 113, the third insulating member 113 is located above the positive electrode column 102, and the third insulating member 113 is located between the second connecting member 108 and the first connecting member 107.

In some embodiments, the third insulating member 113 is also located above the second connecting member 108 and the positive electrode column 102.

In some embodiments, the third insulating member 113 is bonded to the second connecting member 108, and/or the third insulating member 113 is bonded to the first connecting member 107, and/or the third insulating member 113 is bonded above the positive electrode column 102.

For the above fixing member 111, please refer to FIG. 3 or FIG. 6, the fixing member 111 fills a space between the outer end surface 1042 and the protecting member 105 in the concave part 1043, and the fixing member 111 is used to fix the protecting member 105 in the concave part 1043, so that the fixing member 111 limits the movement of the protecting member 105 to protect the protecting member 105 from damage caused by collisions.

The fixing member 111 is formed of fluid resin cured after being poured into the concave part 1043.

The first connecting member 107 extends from the fixing member 111, so that the fixing member 111 limits movement of one end of the first connecting member 107 connected to the protecting member 105, thereby protecting said end from damage caused by collisions.

The second connecting member 108 extends from the fixing member 111, so that the fixing member 111 limits movement of the first end 1081 of the second connecting member 108 connected to the protecting member 105, thereby protecting said end from damage caused by collisions.

Optionally, the fixing member 111 is used to fix the first insulating member 109 in the concave part 1043.

Optionally, the fixing member 111 is used to fix the second insulating member 110 in the concave part 1043.

In some embodiments, the fixing member 111 is a pouring sealant.

In some embodiments, the fixing member 111 is an injection molded part.

In some embodiments, the fixing member 111 also completely covers the outer surface of the protecting member 105, deviated from the bottom of the concave part 1043, so that the fixing member 111 can not only fix the protecting member 105 to the housing 104, but also increase waterproof and corrosion-resistant performance of the protecting member 105, thereby improving overall drop performance of the battery cell 100.

For the above insulating gasket 112, please refer to FIG. 3 or FIG. 6, the insulating gasket 112 is accommodated in the accommodation cavity 1041, the insulating gasket 112 is located between the convex part 1044 of the housing 104 and the electrode assembly 101, and the insulating gasket 112 is used to insulate the housing 104 from the electrode assembly 101. The positive electrode column 102 of the battery cell 100 is connected to the electrode assembly 101, then penetrates the insulating gasket 112, and then penetrates the outer end surface 1042 of the housing 104. The insulating gasket 112 is further provided with a through hole 1121, the through hole 1121 is opposite to the liquid injection port 1045, and the through hole 1121 and the liquid injection port 1045 are configured for liquid injection into the accommodation cavity 1041 of the housing 104.

In some embodiments of the present application, the battery cell 100 includes the housing 104, the electrode assembly 101, the positive electrode column 102, the negative electrode column 103 and the protecting member 105, the housing 104 is provided with the accommodation cavity 1041, and the electrode assembly 101 is accommodated in the accommodation cavity 1041. One end of the positive electrode column 102 and one end the negative electrode column 103 are connected to the electrode assembly 101 respectively. The other ends of the positive electrode column 102 and the negative electrode column 103 respectively protrude from the outer end surface 1042 of the housing 104. The outer end surface 1042 of the housing 104 is concave toward the accommodation cavity 1041 to form the concave part 1043, and the concave part 1043 is disposed between the positive electrode column 102 and the negative electrode column 103. The protecting member 105 is disposed at the concave part 1043, one end of the protecting member 105 is electrically connected to the positive electrode column 102, and another of the protecting member 105 is used for electrical connection with the external device or the external circuit. The concave part 1043 in the housing 104 of the present application is formed concavely toward the accommodation cavity 1041 of the housing 104. Compared with the case in which the concave part 1043 is dug in the housing 104 to place the protecting member 105 in the prior art, in the present application, neither a thickness of the housing 104 nor a weight of the battery cell 100 is additionally increased due to the arrangement of the concave part 1043. In addition, in the present application, both the positive electrode column 102 and the negative electrode column 103 protrude from the outer end surface 1042 of the housing 104, that is, the positive electrode column 102 and the negative electrode column 103 are located on the same side of the housing 104, which is convenient for wiring of the positive electrode column 102 and the negative electrode column 103. The concave part 1043 in the housing 104 of the present application is formed concavely toward the accommodation cavity 1041 of the housing 104, and the concave part 1043 can be used to place the protecting member 105, so that the protecting member 105 in the battery cell 100 utilizes the space of the accommodation cavity 1041 in the housing 104, which can improve overall space utilization rate of the battery cell 100, and improve energy density of the battery cell 100.

An embodiment of the present application further provides an instance of an electrical device, and the electrical device includes a load and the above battery cell 100. The battery cell 100 is connected to the load, and the battery cell 100 is used to supply power to the load. The above embodiments may be referred for the structure and functions of the battery cell 100, which will not be repeated here.

The electrical device may be an energy storage product, a mobile phone, a tablet computer, an unmanned aerial vehicle, an electric vehicle with one or more wheels, or an electric cleaning tool, etc.

For example, for the above unmanned aerial vehicle, a battery pack is mounted on the unmanned aerial vehicle, and the battery pack is used to supply power to loads, including a flight system, a control system, a camera system and the like on the unmanned aerial vehicle.

It should be noted that preferred embodiments of the present application are given in the description and the accompanying drawings of the present application. However, the present application can be implemented in many different forms, and is not limited to the embodiments described in the description. These embodiments are not intended as additional limitations to the content of the present application, and are provided for the purpose of more thoroughly and completely understanding the disclosure of the present application. In addition, the above technical features continue to be combined with each other to form various embodiments not listed above, which are all regarded as the scope recorded in the description of the present application; further, for those of ordinary skill in the art, improvements or transformations can be made according to the above explanation, and all these improvements and transformations should fall within the protection scope of appended claims of the present application.

What is claimed is:

1. A battery cell, comprising:
a housing, an electrode assembly, a positive electrode column and a negative electrode column;
the housing comprising an accommodation cavity, the electrode assembly being accommodated in the accommodation cavity, one end of the positive electrode column and one end of the negative electrode column being electrically connected to the electrode assembly respectively, and the positive electrode column and the negative electrode column respectively protrude from an outer end surface of the housing; wherein,
the outer end surface is concave toward the accommodation cavity to form a concave part, and the concave part is disposed between the positive electrode column and the negative electrode column; and
the battery cell further comprises a protecting member, the protecting member is disposed within the concave part, one end of the protecting member is electrically connected to the positive electrode column, and another end of the protecting member is configured for an electrical connection with an external device or an external circuit,
wherein the battery cell further comprises a heat-conducting member, the heat-conducting member is disposed between the protecting member and a bottom of the concave part, wherein the heat-conducting member is bonded to the bottom of the concave part;
the concave part is provided with a liquid injection port, and the liquid injection port is configured for liquid injection into the accommodation cavity, wherein the liquid injection port is covered by the heat-conducting member.

2. The battery cell according to claim 1, wherein the battery cell further comprises a first connecting member and a second connecting member, two ends of the first connecting member are electrically connected to the protecting member and the positive electrode column respectively, a first end of the second connecting member is connected to the protecting member, and a second end of the second connecting member is configured for electrical connection with the external device or the external circuit.

3. The battery cell according to claim 2, wherein the battery cell further comprises a first insulating member, the first insulating member is disposed between the first connecting member and the outer end surface of the housing, and the first insulating member is configured for insulating the first connecting member from the housing.

4. The battery cell according to claim 2, wherein the battery cell further comprises a second insulating member, the second insulating member is disposed between the second connecting member and the outer end surface at the concave part, and the second insulating member is configured for insulating the second connecting member from the housing.

5. The battery cell according to claim 2, wherein the battery cell further comprises a fixing member, the fixing member fills a space between the outer end surface and the protecting member in the concave part, the fixing member is configured for fixing the protecting member in the concave part, and the first connecting member and the second connecting member respectively extend from the fixing member.

6. The battery cell according to claim 2, wherein the second connecting member is bent and extends out of the housing, and the second end of the second connecting member is located between the positive electrode column and the negative electrode column.

7. The battery cell according to claim 2, wherein the second connecting member is bent and extends out of the housing and toward the positive electrode column, and the second end of the second connecting member is bent and extends to be above the positive electrode column.

8. The battery cell according to claim 1, wherein the protecting member comprises a temperature cut-off (TCO), a positive temperature coefficient materials (PTC) or a printed circuit board (PCB).

9. An electrical device, comprising the battery cell according to claim 1.

10. The electrical device according to claim 9, wherein the battery cell further comprises a first connecting member and a second connecting member, two ends of the first connecting member are electrically connected to the protecting member and the positive electrode column respectively, a first end of the second connecting member is connected to the protecting member, and a second end of the second connecting member is configured for electrical connection with the external device or the external circuit.

11. The electrical device according to claim 10, wherein the battery cell further comprises a first insulating member, the first insulating member is disposed between the first connecting member and the outer end surface of the housing, and the first insulating member is configured for insulating the first connecting member from the housing.

12. The electrical device according to claim 10, wherein the battery cell further comprises a second insulating member, the second insulating member is disposed between the second connecting member and the outer end surface at the concave part, and the second insulating member is configured for insulating the second connecting member from the housing.

13. The electrical device according to claim 10, wherein the battery cell further comprises a fixing member, the fixing member fills a space between the outer end surface and the protecting member in the concave part, the fixing member is configured for fixing the protecting member in the concave part, and the first connecting member and the second connecting member respectively extend from the fixing member.

14. The electrical device according to claim 10, wherein the second connecting member is bent and extends out of the housing, and the second end of the second connecting member is located between the positive electrode column and the negative electrode column.

15. The electrical device according to claim 10, wherein the second connecting member is bent and extends out of the housing and toward the positive electrode column, and the second end of the second connecting member is bent and extends to be above the positive electrode column.

16. The electrical device according to claim 9, wherein the protecting member comprises a temperature cut-off (TCO), a positive temperature coefficient materials (PTC) or a printed circuit board (PCB).

* * * * *